US005754974A

United States Patent [19]

Griffin et al.

[11] Patent Number: 5,754,974

[45] Date of Patent: May 19, 1998

[54] SPECTRAL MAGNITUDE REPRESENTATION FOR MULTI-BAND EXCITATION SPEECH CODERS

[75] Inventors: Daniel W. Griffin, Hollis, N.H.; John C. Hardwick, Sudbury, Mass.

[73] Assignee: Digital Voice Systems, Inc. Burlington, Mass.

[21] Appl. No.: 392,188

[22] Filed: Feb. 22, 1995

[51] Int. Cl.$^6$ .......... G01L 7/02

[52] U.S. Cl. .......... 704/206; 704/205; 704/208; 704/223

[58] Field of Search .......... 395/2.14, 2.15, 395/2.16, 2.17, 2.28, 2.31, 2.32, 2.73, 2.75, 2.77; 381/41, 51

[56] References Cited

U.S. PATENT DOCUMENTS

| | | | |
|---|---|---|---|
| 3,706,929 | 12/1972 | Robinson et al. | 375/216 |
| 3,975,587 | 8/1976 | Dunn et al. | 395/2.17 |
| 3,982,070 | 9/1976 | Flanagan | 395/2.74 |
| 3,995,116 | 11/1976 | Flanagan | 395/2.76 |
| 4,004,096 | 1/1977 | Bauer et al. | 395/2.16 |
| 4,015,088 | 3/1977 | Dubnowski et al. | 395/2.17 |
| 4,074,228 | 2/1978 | Jonscher | 371/45 |
| 4,076,958 | 2/1978 | Fulghum | 395/2.77 |
| 4,091,237 | 5/1978 | Wolnowsky et al. | 395/2.16 |
| 4,441,200 | 4/1984 | Fette et al. | 395/2.16 |
| 4,618,982 | 10/1986 | Horvath et al. | 395/2.28 |
| 4,622,680 | 11/1986 | Zinser | 375/245 |
| 4,672,669 | 6/1987 | Des Blache et al. | 395/2.46 |
| 4,696,038 | 9/1987 | Doddington et al. | 395/2.28 |
| 4,720,861 | 1/1988 | Bertrand | 395/2.31 |
| 4,797,926 | 1/1989 | Bronson et al. | 395/2.23 |
| 4,799,059 | 1/1989 | Grindahl et al. | 340/870.03 |
| 4,809,334 | 2/1989 | Bhaskar | 395/2.16 |
| 4,813,075 | 3/1989 | Ney | 395/2.25 |
| 4,879,748 | 11/1989 | Picone et al. | 395/2.17 |
| 4,885,790 | 12/1989 | McAulay et al. | 395/2.74 |
| 4,989,247 | 1/1991 | Van Hemert | 395/2.16 |
| 5,023,910 | 6/1991 | Thomson | 395/2.15 |
| 5,036,515 | 7/1991 | Freeburg | 371/5.5 |
| 5,054,072 | 10/1991 | McAulay et al. | 395/2.16 |
| 5,067,158 | 11/1991 | Arjmand | 395/2.28 |
| 5,081,681 | 1/1992 | Hardwick | 395/2.77 |
| 5,091,944 | 2/1992 | Takahashi | 395/2.28 |
| 5,095,392 | 3/1992 | Shimazaki et al. | 360/40 |
| 5,195,166 | 3/1993 | Hardwick et al. | 395/2.09 |
| 5,216,747 | 6/1993 | Hardwick et al. | 395/2.17 |
| 5,226,084 | 7/1993 | Hardwick et al. | 395/2.28 |
| 5,226,108 | 7/1993 | Hardwick et al. | 395/2.09 |
| 5,247,579 | 9/1993 | Hardwick et al. | 395/2.39 |
| 5,265,167 | 11/1993 | Akamine et al. | 395/2.29 |
| 5,517,511 | 5/1996 | Hardwick et al. | 371/37.4 |

FOREIGN PATENT DOCUMENTS

| | | | |
|---|---|---|---|
| 0 123 456 | 10/1984 | European Pat. Off. | H04N 7/12 |
| 154381 | 9/1985 | European Pat. Off. | G10L 9/14 |
| 0 303 312 | 2/1989 | European Pat. Off. | G10L 7/02 |
| WO 92/05539 | 4/1992 | WIPO | G10L 7/02 |
| WO 92/10830 | 6/1992 | WIPO | G10L 5/00 |

OTHER PUBLICATIONS

Quatieri, et al. "Speech Transformations Based on A Sinusoidal Representation", IEEE, TASSP, vol., ASSP34 No. 6, Dec. 1986, pp. 1449–1464.

(List continued on next page.)

*Primary Examiner*—Allen R. MacDonald
*Assistant Examiner*—Tālivaldis Ivars Smits
*Attorney, Agent, or Firm*—Fish & Richardson P.C.

[57] ABSTRACT

A method for encoding a speech signal into digital bits including the steps of dividing the speech signal into speech frames representing time intervals of the speech signal, determining voicing information for frequency bands of the speech frames, and determining spectral magnitudes representative of the magnitudes of the spectrum at determined frequencies across the frequency bands. The method further includes quantizing and encoding the spectral magnitudes and the voicing information. The steps of determining, quantizing and encoding the spectral magnitudes is done is such a manner that the spectral magnitudes independent of voicing information are available for later synthesizing.

19 Claims, 2 Drawing Sheets

OTHER PUBLICATIONS

Griffin, et al., "A High Quality 9.6 Kbps Speech Coding System", Proc. ICASSP 86, pp. 125–128 Tokyo, Japan, Apr. 13–20, 1986.

Griffin et al., "A New Model–Based Speech Analysis/Synthesis System", Proc. ICASSP 85 pp. 513–516, Tampa, FL., Mar. 26–29, 1985.

Hardwick, "A 4.8 Kbps Multi–Band Excitation Speech Coder", S.M. Thesis, M.I.T, May 1988.

McAulay et al., "Mid–Rate Coding Based on a Sinusoidal Representation of Speech", Proc. IEEE 1985 pp. 945–948.

Hardwick et al. "A 4.8 Kbps Multi–band Excitation Speech Coder," Proceeding from ICASSP, International Conference on Acoustics, Speech and Signal Processing, New York, N.Y., Apr. 11–14, pp. 374–377 (1988).

Griffin et al., "Multiband Excitation Vocoder" IEEE Transactions on Acoustics, Speech and Signal Processing, vol. 36, No. 8, pp. 1223–1235 (1988).

Almeidea et al., "Harmonic Coding: A Low Bit–Rate, Good–Quality Speech Coding Technique," IEEE (CH 1746–7/82/0000 1684) pp. 1664–1667 (1982).

Tribolet et al., "Frequency Domain Coding of Speech, " IEEE Transactions on Acoustics, Speech and Signal Processing, V. ASSP–27, No. 5, pp. 512–530 (Oct. 1979).

McAulay et al., "Speech Analysis/Synthesis Based on A Sinusoidal Representation," IEEE Transactions on Acoustics, Speech and Signal Processing V. 34, No. 4, pp. 744–754, (Aug. 1986).

Griffin, et al. "A New Pitch Detection Algorithm", Digital Signal Processing, No. 84, pp. 395–399.

McAulay, et al., "Computationally Efficient Sine–Wave Synthesis and Its Application to Sinusoidal Transform Coding", IEEE 1988, pp. 370–373.

Portnoff, Short–Time Fourier Analysis of Sampled Speech, IEEE Transactions on Acoustics, Speech, and Signal Processing, vol. ASSP–29, No. 3, Jun. 1981, pp. 324–333.

Griffin et al. "Signal Estimation from modified Short t–Time Fourier Transform", IEEE Transactions on Acoustics, Speech, and Signal Processing, vol. ASSP–32, No. 2, Apr. 1984, pp. 236–243.

Almeida, et al. "Variable–Frequency Synthesis: An Improved Harmonic Coding Scheme", ICASSP 1984 pp. 27.5.1–27.5.4.

Flanagan, J.L., Speech Analysis Synthesis and Perception, Springer–Verlag, 1982, pp. 378–386.

Secrest, et al., "Postprocessing Techniques for Voice Pitch Trackers", ICASSP, vol. 1, 1982, pp. 171–175.

Patent Abstracts of Japan, vol. 14, No. 498 (P–1124), Oct. 30, 1990.

Mazor et al., "Transform Subbands Coding With Channel Error Control", IEEE 1989, pp. 172–175.

Brandstein et al., "A Real–Time Implementation of the Improved MBE Speech Coder", IEEE 1990, pp. 5–8.

Levesque et al., "A Proposed Federal Standard for Narrowband Digital Land Mobile Radio", IEEE 1990, pp. 497–501.

Yu et al., "Discriminant Analysis and Supervised Vector Quantization for Continuous Speech Recognition", IEEE 1990, pp. 685–688.

Jayant et al., *Digital Coding of Waveform*, Prentice–Hall, 1984.

Atungsiri et al., "Error Detection and Control for the Parametric Information in CELP Coders", IEEE 1990, pp. 229–232.

Digital Voice Systems, Inc., "Inmarsat–M Voice Coder", Version 1.9, Nov. 18, 1992.

Campbell et al., "The New 4800 bps Voice Coding Standard", Mil Speech Tech Conference, Nov. 1989.

Chen et al., "Real–Time Vector APC Speech Coding at 4800 bps with Adaptive Postfiltering", Proc. ICASSP 1987, pp. 2185–2188.

Jayant et al., "Adaptive Postfiltering of 16 kb/s–ADPCM Speech", Proc. ICASSP 86, Tokyo, Japan, Apr. 13–20, 1986, pp. 829–832.

Makhoul et al., "Vector Quantization in Speech Coding", Proc. IEEE, 1985, pp. 1551–1588.

Rahikka et al., "CELP Coding for Land Mobile Radio Applications," Proc. ICASSP 90, Albuquerque, New Mexico, Apr. 3–6, 1990, pp. 465–468.

Cox et al., "Subband Speech Coding and Matched Convolutional Channel Coding for Mobile Radio Channels," IEEE Trans. Signal Proc., vol. 39, No. 8 (Aug. 1991), pp. 1717–1731.

Digital Voice Systems, Inc., "The DVSI IMBE Speech Compression System," advertising brochure (May 12, 1993).

Digital Voice Systems, Inc., "The DVSI IMBE Speech Coder," advertising brochure (May 12, 1993).

Fujimura, "An Approximation to Voice Aperiodicity", IEEE Transactions on Audio and Electroacoutics, vol. AU–16, No. 1 (Mar. 1968), pp. 68–72.

Griffin et al., "Multiband Excitation Vocoder" IEEE Transactions on Acoustics, Speech and Signal Processing, vol. 36, No. 8 (1988) pp. 1223–1235.

Hardwick et al. "The Application of the IMBE Speech Coder to Mobile Communications," IEEE (1991), pp. 249–252 ICASSP 91, May 1991.

Heron, "A 32–Band Sub–band/Transform Coder Incorporation Vector Quantization for Dynamic Bit Allocation", IEEE (1983), pp. 1276–1279.

Makhoul, "A Mixed–Source Model For Speech Compression And Synthesis", IEEE (1978), pp. 163–166 ICASSP 78.

Maragos et al., "Speech Nonlinearities, Modulations, and Energy Operators", IEEE (1991), pp. 421–424 ICASSP 91, May 1991.

Quackenbush et al., "The Estimation And Evaluation Of Pointwise NonLinearities For Improving The Performance Of Objective Speech Quality Measures", IEEE (1983), pp. 547–550, ICASSP 83.

McCree et al., "A New Mixed Excitation LPC Vocoder", IEEE (1991), pp. 593–595, ICASSP 91, May 1991.

McCree et al., "Improving The Performance Of A Mixed Excitation LPC Vocoder in Acoustic Noise", IEEE ICASSP 92, Mar. 1992.

SPECTRAL MAGNITUDE REPRESENTATION FOR MULTI-BAND EXCITATION SPEECH CODERS

REFERENCE TO RELATED APPLICATIONS

This application is related to copending U.S. application Ser. No. 08/392,099 filed on even date herewith by the same inventors, entitled Synthesis of Speech Using Regenerated Phase Information (hereby incorporated by reference).

BACKGROUND OF THE INVENTION

The present invention relates to methods for representing speech to facilitate efficient low to medium rate encoding and decoding.

Relevant publications include: J. L. Flanagan, Speech Analysis, Synthesis and Perception, Springer-Verlag, 1972, pp. 378–386, (discusses phase vocoder - frequency-based speech analysis-synthesis system); Jayant et al., *Digital Coding of Waveforms*, Prentice-Hall, 1984, (discusses speech coding in general); U.S. Pat. No. 4,885,790 discloses sinusodial processing method); U.S. Pat. No. 5,054,072 (discloses sinusoidal coding method); Almeida et al., "Nonstationary Modelling of Voiced Speech", IEEE TASSP, Vol. ASSP-31, No. 3, Jun. 1983, pp 664–677, (discloses harmonic modelling and coder); Almeida et al., "Variable Frequency Synthesis: An Improved Harmonic Coding Scheme", IEEE Proc. ICASSP 84, pp 27.5.1–27.5.4, (discloses polynomial voiced synthesis method); Quatieri, et al., "Speech Transformations Based on a Sinusoidal Representation", IEEE TASSP, Vol, ASSP34, No. 6, Dec. 1986, pp. 1449–1986, (discusses analysis-synthesis technique based on a sinusoidal representation); McAulay et al., "Mid-Rate Coding Based on a Sinusoidal Representation of Speech", Proc. ICASSP 85, pp. 945–948, Tampa, Fla., Mar. 26–29, 1985, (discusses the sinusoidal transform speech coder); Griffin, "Multiband Excitation Vocoder", Ph.D. Thesis, M.I.T, 1987, (discusses Multi-Band Excitation (MBE) speech model and an 8000 bps MBE speech coder); Hardwick, "A 4.8 kbps Multi-Band Excitation Speech Coder", SM. Thesis, M.I.T, May 1988, (discusses a 4800 bps Multi-Band Excitation speech coder); Telecommunications Industry Association (TIA), "APCO Project 25 Vocoder Description", Version 1.3, Jul. 15, 1993, IS102BABA (discusses 7.2 kbps IMBE™ speech coder for APCO Project 25 standard); U.S. Pat. No. 5,081,681 (discloses MBE random phase synthesis); U.S. Pat. No. 5,247,579 (discloses MBE channel error mitigation method and formant enhancement method); U.S. Pat. No. 5,226,084 (discloses MBE quantization and error mitigation methods). The contents of these publications are incorporated herein by reference. (IMBE is a trademark of Digital Voice Systems, Inc.)

The problem of encoding and decoding speech has a large number of applications and hence it has been studied extensively. In many cases it is desirable to reduce the data rate needed to represent a speech signal without substantially reducing the quality or intelligibility of the speech. This problem, commonly referred to as "speech compression", is performed by a speech coder or vocoder.

A speech coder is generally viewed as a two part process. The first part, commonly referred to as the encoder, starts with a digital representation of speech, such as that generated by passing the output of a microphone through an A-to-D converter, and outputs a compressed stream of bits. The second part, commonly referred to as the decoder, converts the compressed bit stream back into a digital representation of speech which is suitable for playback through a D-to-A converter and a speaker. In many applications the encoder and decoder are physically separated and the bit steam is transmitted between them via some communication channel.

A key parameter of a speech coder is the amount of compression it achieves, which is measured via its bit rate. The actual compressed bit rate achieved is generally a function of the desired fidelity (i.e., speech quality) and the type of speech. Different types of speech coders have been designed to operate at high rates (greater than 8 kbps), mid-rates (3–8 kbps) and low rates (less than 3 kbps). Recently, mid-rate speech coders have been the subject of strong interest in a wide range of mobile communication applications (cellular, satellite telephony, land mobile radio, in-flight phones, etc . . . ). These applications typically require high quality speech and robustness to artifacts caused by acoustic noise and channel noise (bit errors).

One class of speech coders, which have been shown to be highly applicable to mobile communications, is based upon an underlying model of speech. Examples from this class include linear prediction vocoders, homomorphic vocoders, sinusoidal transform coders, multi-band excitation speech coders and channel vocoders. In these vocoders, speech is divided into short segments (typically 10–40 ms) and each segment is characterized by a set of model parameters. These parameters typically represent a few basic elements, including the pitch, the voicing state and spectral envelope, of each speech segment. A model-based speech coder can use one of a number of known representations for each of these parameters. For example the pitch may be represented as a pitch period, a fundamental frequency, or a long-term prediction delay as in CELP coders. Similarly the voicing state can be represented through one or more voiced/unvoiced decisions, a voicing probability measure, or by the ratio of periodic to stochastic energy. The spectral envelope is often represented by an all-pole filter response (LPC) but may equally be characterized by a set of harmonic amplitudes or other spectral measurements. Since usually only a small number of parameters are needed to represent a speech segment, model based speech coders are typically able to operate at medium to low data rates. However, the quality of a model-based system is dependent on the accuracy of the underlying model. Therefore a high fidelity model must be used if these speech coders are to achieve high speech quality.

One speech model which has been shown to provide good quality speech and to work well at medium to low bit rates is the Multi-Band Excitation (MBE) speech model developed by Griffin and Lim. This model uses a flexible voicing structure which allows it to produce more natural sounding speech, and which makes it more robust to the presence of acoustic background noise. These properties have caused the MBE speech model to be employed in a number of commercial mobile communication applications.

The MBE speech model represents segments of speech using a fundamental frequency, a set of binary voiced or unvoiced (V/UV) decisions and a set of harmonic amplitudes. The primary advantage of the MBE model over more traditional models is in the voicing representation. The MBE model generalizes the traditional single V/UV decision per segment into a set of decisions, each representing the voicing state within a particular frequency band. This added flexibility in the voicing model allows the MBE model to better accommodate mixed voicing sounds, such as some voiced fricatives. In addition this added flexibility allows a more accurate representation of speech corrupted by acoustic background noise. Extensive testing has shown that this generalization results in improved voice quality and intelligibility.

The encoder of an MBE based speech coder estimates the set of model parameters for each speech segment. The MBE model parameters consist of a fundamental frequency, which is the reciprocal of the pitch period; a set of V/UV decisions which characterize the voicing state; and a set of spectral amplitudes which characterize the spectral envelope. Once the MBE model parameters have been estimated for each segment, they are quantized at the encoder to produce a frame of bits. These bits are then optionally protected with error correction/detection codes (ECC) and the resulting bit stream is then transmitted to a corresponding decoder. The decoder converts the received bit stream back into individual frames, and performs optional error control decoding to correct and/or detect bit errors. The resulting bits are then used to reconstruct the MBE model parameters from which the decoder synthesizes a speech signal which is perceptually close to the original. In practice the decoder synthesizes separate voiced and unvoiced components and adds the two components to produce the final output.

In MBE based systems a spectral amplitude is used to represent the spectral envelope at each harmonic of the estimated fundamental frequency. Typically each harmonic is labeled as either voiced or unvoiced depending upon whether the frequency band containing the corresponding harmonic has been declared voiced or unvoiced. The encoder then estimates a spectral amplitude for each harmonic frequency, and in prior art MBE systems a different amplitude estimator is used depending upon whether it has been labeled voiced or unvoiced. At the decoder the voiced and unvoiced harmonics are again identified and separate voiced and unvoiced components are synthesized using different procedures. The unvoiced component is synthesized using a weighted overlap-add method to filter a white noise signal. The filter is set to zero all frequency regions declared voiced while otherwise matching the spectral amplitudes labeled unvoiced. The voiced component is synthesized using a tuned oscillator bank, with one oscillator assigned to each harmonic labeled voiced. The instantaneous amplitude, frequency and phase is interpolated to match the corresponding parameters at neighboring segments.

Although MBE based speech coders have been shown to offer good performance, a number of problems have been identified which lead to some degradation in speech quality. Listening tests have established that in the frequency domain both the magnitude and phase of the synthesized signal must be carefully controlled in order to obtain high speech quality and intelligibility. Artifacts in the spectral magnitude can have a wide range of effects, but one common problem at mid-to-low bit rates is the introduction of a muffled quality and/or an increase in the perceived nasality of the speech. These problems are usually the result of significant quantization errors (caused by too few bits) in the reconstructed magnitudes. Speech formant enhancements methods, which amplify the spectral magnitudes corresponding to the speech formants, while attenuating the remaining spectral magnitudes, have been employed to try to correct these problems. These methods improve perceived quality up to a point, but eventually the distortion they introduce becomes too great and quality begins to deteriorate.

Performance is often further reduced by the introduction of phase artifacts, which are caused by the fact that the decoder must regenerate the phase of the voiced speech component. At low to medium data rates there are not sufficient bits to transmit any phase information between the encoder and the decoder. Consequently, the encoder ignores the actual signal phase, and the decoder must artificially regenerate the voiced phase in a manner which produces natural sounding speech.

Extensive experimentation has shown that the regenerated phase has a significant effect on perceived quality. Early methods of regenerating the phase involved simple integration of the harmonic frequencies from some set of initial phases. This procedure ensured the voiced component was continuous at segment boundaries; however, choosing a set of initial phases which resulted in high quality speech was found to be problematic. If the initial phases were set to zero, the resulting speech was judged to be "buzzy", while if the initial phase was randomized the speech was judged "reverberant". This result led to a better approach described in U.S. Pat. No. 5,081,681, where depending on the V/UV decisions, a controlled amount of randomness was added to the phase in order to adjust the balance between "buzziness" and "reverberance". Listening tests showed that less randomness was preferred when the voiced component dominated the speech, while more phase randomness was preferred when the unvoiced component dominated. Consequently, a simple voicing ratio was computed to control the amount of phase randomness in this manner. Although voicing dependent random phase was shown to be adequate for many applications, listening experiments still traced a number of quality problems to the voiced component phase. Tests confirmed that the voice quality could be significantly improved by removing the use of random phase, and instead individually controlling the phase at each harmonic frequency in a manner which more closely matched actual speech. This discovery has led to the present invention, described here in the context of the preferred embodiment.

SUMMARY OF THE INVENTION

In a first aspect, the invention features a new spectral magnitude representation which has been shown to significantly improve the performance of MBE based speech encoders. The speech signal is divided into frames, voicing information is determined for a plurality of frequency bands of the frames, spectral magnitudes are estimated at a plurality of determined frequencies (e.g. harmonics of an estimated fundamental frequency) across the frequency bands, and the spectral magnitudes and voicing information are quantized and encoded for subsequent use in decoding and synthesizing the speech signal, all in a manner that spectral magnitudes independent of the voicing information are available for later synthesizing.

Preferably, the voicing information represents whether particular frequency bands (each band may include several harmonics) are processed as voiced or unvoiced bands, and the spectral magnitude for a particular determined frequency is estimated independently of whether the determined frequency is in a frequency band that is voiced or unvoiced. The digital bits representing the encoded information may include redundant bits providing forward error correction coding (e.g., Golay codes and Hamming codes).

In a second aspect, the invention features estimating the spectral magnitudes by performing a spectral transformation of the speech frames from time domain samples to frequency domain samples, and forming the spectral magnitudes as weighted sums of the frequency samples. Preferably, the weights used in producing the weighted sums have the effect of compensating for the sampling grid used in the spectral transformation.

The invention can provide spectral magnitudes at each determined frequency (e.g. harmonics of the fundamental)

that are independent of the voicing state and which correct for any offset between the harmonic and the frequency sampling grid. The result is a fast, FFT compatible method which produces a smooth set of spectral magnitudes without the sharp discontinuities introduced by voicing transistions as found in prior MBE based speech coders. The increased smoothness results in improved quantization efficiency, thereby producing higher speech quality at lower bit rates. In addition, spectral enhancement methods, typically used to reduce the effect of bit errors or to enhance formants, are more effective since they are not confused by false edges (i.e. discontinuities) at voicing transitions. Overall speech quality and intelligibility are consequently improved.

Other features and advantages of the invention will be apparent from the following description of the preferred embodiments and from the claims.

DESCRIPTION

Figure 1:
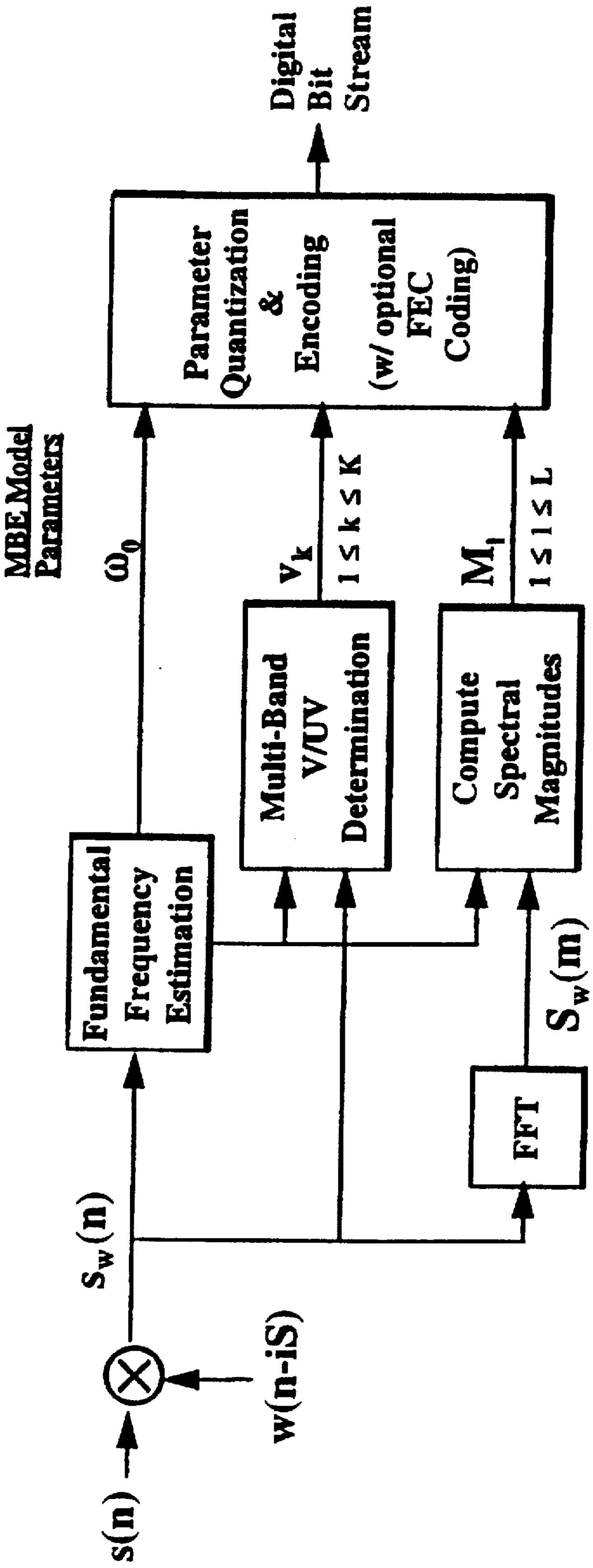
FIG. 1 is a block diagram of an MBE based speech encoder.

FIG. 1 is a drawing of the invention, embodied in the new MBE based speech encoder. A digital speech signal s(n) is first segmented with a sliding window function w(n-iS) where the frame shift S is typically equal to 20 ms. The resulting segment of speech, denoted $s_w(n)$ is then processed to estimate the fundamental frequency $\omega_0$, a set of Voiced/Unvoiced decisions, $v_k$, and a set of spectral magnitudes, $M_l$. The spectral magnitudes are computed, independent of the voicing information, after transforming the speech segment into the spectral domain with a Fast Fourier Transform (FFT). The frame of MBE model parameters are then quantized and encoded into a digital bit stream. Optional FEC redundancy is added to protect the bit stream against bit errors during transmission.

Figure 2:
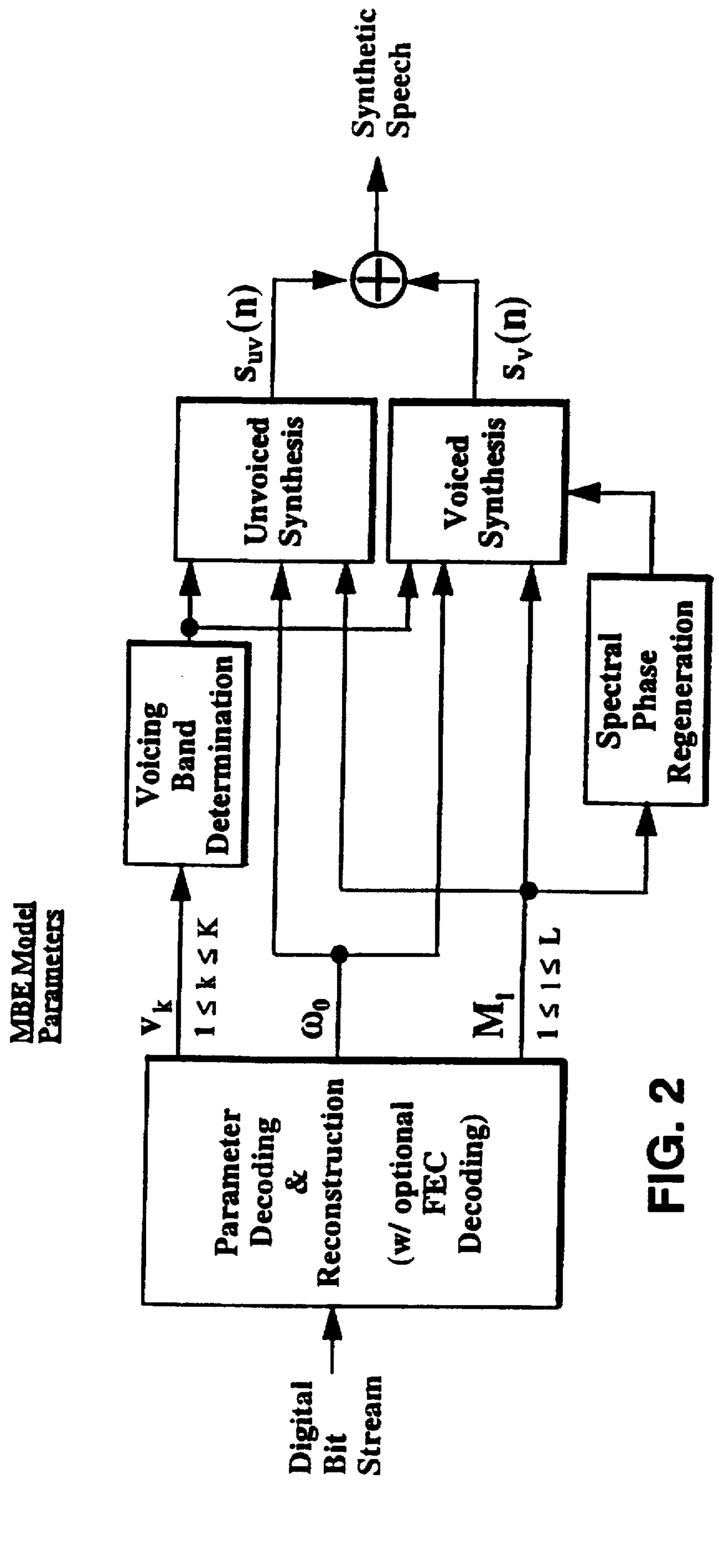
FIG. 2 is a block diagram of an MBE based speech decoder.

FIG. 2 is a drawing of the invention embodied in the new MBE based speech decoder. The digital bit stream, generated by the corresponding encoder as shown in FIG. 1, is first decoded and used to reconstruct each frame of MBE model parameters. The reconstructed voicing information, $v_k$, is used to reconstruct K voicing bands and to label each harmonic frequency as either voiced or unvoiced, depending upon the voicing state of the band in which it is contained. Spectral phases, $\phi_l$ are regenerated from the spectral magnitudes, $M_l$, and then used to synthesize the voiced component $s_v(n)$, representing all harmonic frequencies labelled voiced. The voiced component is then added to the unvoiced component (representing unvoiced bands) to create the synthetic speech signal.

The preferred embodiment of the invention is described in the context of a new MBE based speech coder. This system is applicable to a wide range of environments, including mobile communication applications such as mobile satellite, cellular telephony, land mobile radio (SMR, PMR), etc. . . . This new speech coder combines the standard MBE speech model with a novel analysis/synthesis procedure for computing the model parameters and synthesizing speech from these parameters. The new method allows speech quality to be improved while lowering the bit rate needed to encode and transmit the speech signal. Although the invention is described in the context of this particular MBE based speech coder, the techniques and methods disclosed herein can readily be applied to other systems and techniques by someone skilled in the art without departing from the spirit and scope of this invention.

In the new MBE based speech coder a digital speech signal sampled at 8 kHz is first divided into overlapping segments by multiplying the digital speech signal by a short (20–40) window function such as a Hamming window. Frames are typically computed in this manner every 20 ms, and for each frame the fundamental frequency and voicing decisions are computed. In the new MBE based speech coder these parameters are computed according to the new improved method described in the pending U.S. patent applications, Ser. Nos. 08/222,119, and 08/371,743, both entitled "ESTIMATION OF EXCITATION PARAMETERS". Alternatively, the fundamental frequency and voicing decisions could be computed as described in TIA Interim Standard IS102BABA, entitled "APCO Project 25 Vocoder". In either case a small number of voicing decisions (typically twelve or less) is used to model the voicing state of different frequency bands within each frame. For example, in a 3.6 kbps speech coder eight V/UV decisions are typically used to represent the voicing state over eight different frequency bands spaced between 0 and 4 kHz.

Letting s(n) represent the discrete speech signal, the speech spectrum for the i'th frame, $S_w(\omega,i\cdot S)$ is computed according to the following equation:

$$S_w(\omega, i) = \sum_n s(n)w(n - i \cdot S)e^{-j\omega n} \quad (1)$$

where w(n) is the window function and S is the frame size which is typically 20 ms (160 samples at 8 kHz). The estimated fundamental frequency and voicing decisions for the i'th frame are then represented as $\omega_0(i\cdot S)$ and $v_k(i\cdot S)$ for $1 \leq k \leq K$, respectively, where K is the total number of V/UV decision (typically K=8). For notational simplicity the frame index i·S can be dropped when referring to the current frame, thereby denoting the current spectrum, fundamental, and voicing decisions as: $S_w(\omega)$, $\omega_0$ and $v_k$, respectively.

In MBE systems the spectral envelope is typically represented as a set of spectral amplitudes which are estimated from the speech spectrum $S_w(\omega)$. Spectral amplitudes are typically computed at each harmonic frequency (i.e. at $\omega=\omega_0 l$, for l=0,1, . . . ). Unlike the prior art MBE systems, the invention features a new method for estimating these spectral amplitudes which is independent of the voicing state. This results in a smoother set of spectral amplitudes since the discontinuities are eliminated, which are normally present in prior art MBE systems whenever a voicing transition occurs. The invention features the additional advantage of providing an exact representation of the local spectral energy, thereby preserving perceived loudness. Furthermore, the invention preserves local spectral energy while compensating for the effects of the frequency sampling grid normally employed by a highly efficient Fast Fourier Transform (FFT). This also contributes to achieving a smooth set of spectral amplitudes. Smoothness is important for overall performance since it increases quantization efficiency and it allows better formant enhancement (i.e. postfiltering) as well as channel error mitigation.

In order to compute a smooth set of the spectral magnitudes, it is necessary to consider the properties of both voiced and unvoiced speech. For voiced speech, the spectral energy (i.e. $|S_w(\omega)|^2$) is concentrated around the harmonic frequencies, while for unvoiced speech, the spectral energy is more evenly distributed. In prior art MBE systems, unvoiced spectral magnitudes are computed as the average spectral energy over a frequency interval (typically equal to the estimated fundamental) centered about each corresponding harmonic frequency. In contrast, the voiced spectral magnitudes in prior art MBE systems are set equal to some fraction (often one) of the total spectral energy in the same frequency interval. Since the average energy and the total energy can be very different, especially when the frequency interval is wide (i.e. a large fundamental), a discontinuity is often introduced in the spectral magnitudes, whenever consecutive harmonics transition between voicing states (i.e. voiced to unvoiced, or unvoiced to voiced).

One spectral magnitude representation which can solve the aforementioned problem found in prior art MBE systems is to represent each spectral magnitude as either the average spectral energy or the total spectral energy within a corresponding interval. While both of these solutions would remove the discontinuities at voicing transistions, both would introduce other fluctuations when combined with a spectral transformation such as a Fast Fourier Transform (FFT) or equivalently a Discrete Fourier Transform (DFT). In practice an FFT is normally used to evaluate $S_w(\omega)$ on a uniform sampling grid determined by the FFT length, N, which is typically a power of two. For example an N point FFT would produce N frequency samples between 0 and $2\pi$ as shown in the following equation:

$$S_w(m) = \sum_{n=0}^{N-1} s(n)w(n - i \cdot S)e^{\frac{-j2\pi nm}{N}} \quad \text{for } 0 \leq m < N \tag{2}$$

In the preferred embodiment the spectrum is computed using an FFT with N=256, and w(n) is typically set equal to the 255 point symmetric window function presented in Table 1, which is provided in the Appendix.

It is desirable to use an FFT to compute the spectrum due to it's low complexity. However, the resulting sampling interval, $2\pi/N$, is not generally an inverse multiple of the fundamental frequency. Consequently, the number of FFT samples between any two consecutive harmonic frequencies is not constant between harmonics. The result is that if average spectral energy is used to represent the harmonic magnitudes, then voiced harmonics, which have a concentrated spectral distribution, will experience fluctuations between harmonics due to the varying number of FFT samples used to compute each average. Similarly, if total spectral energy is used to represent the harmonic magnitudes, then unvoiced harmonics, which have a more uniform spectral distribution, will experience fluctuations between harmonics due to the varying number of FFT samples over which the total energy is computed. In either case the small number of frequency samples available from the FFT can introduce sharp fluctuations into the spectral magnitudes, particularly when the fundamental frequency is small.

The invention uses a compensated total energy method for all spectral magnitudes to remove discontinuities at voicing transitions. The invention's compensation method also prevents FFT related fluctuations from distorting either the voiced or unvoiced magnitudes. In particular, the invention computes the set of spectral magnitudes for the current frame, denoted by $M_l$ for $0 \leq l \leq L$ according to the following equation:

$$M_l = \left[ \frac{\sum_{m=0}^{N-1} |S_w(m)|^2 G\left(\frac{2\pi m}{N} - l\omega_0\right)}{N \sum_{m=0}^{N-1} w^2(n)} \right]^{\frac{1}{2}} \tag{3}$$

It can be seen from this equation, that each spectral magnitude is computed as a weighted sum of the spectral energy $|S_w(m)|^2$, where the weighting function is offset by the harmonic frequency for each particular spectral magnitude. The weighting function $G(\omega)$ is designed to compensate for the offset between the harmonic frequency $l\omega_0$ and the FFT frequency samples which occur at $2\pi m/N$. This function is changed each frame to reflect the estimated fundamental frequency as follows:

$$G(\omega) = \begin{cases} 1 & \text{for } |\omega| < \frac{\omega_0}{2} - \frac{\pi}{N} \\ \frac{1}{2} - \frac{N}{2\pi}\left(\omega - \frac{\omega_0}{2}\right) & \text{for } \frac{\omega_0}{2} - \frac{\pi}{N} \leq |\omega| < \frac{\omega_0}{2} + \frac{\pi}{N} \\ 0 & \text{otherwise} \end{cases} \tag{4}$$

One valuable property of this spectral magnitude representation is that it is based on the local spectral energy (i.e $|S_w(m)|^2$) for both voiced and unvoiced harmonics. Spectral energy is generally considered to be a close approximation of the way humans perceive speech, since it conveys both the relative frequency content and the loudness information without being effected by the phase of the speech signal. Since the new magnitude representation is independent of the voicing state, there are no fluctuations or discontinuities in the representation due to transitions between voiced and unvoiced regions or due to a mixture of voiced and unvoiced energy. The weighting function $G(\omega)$ further removes any fluctuations due to the FFT sampling grid. This is achieved by interpolating the energy measured between harmonics of the estimated fundamental in a smooth manner. An additional advantage of the weighting functions disclosed in Equation (4) is that the total energy in the speech is preserved in the spectral magnitudes. This can be seen more clearly by examining the following equation for the total energy in the set of spectral magnitudes.

$$\sum_{l=0}^{L} |M_l|^2 = \frac{1}{N \sum_{n=0}^{N-1} w^2(n)} \sum_{m=0}^{N-1} |S_w(m)|^2 \sum_{l=0}^{L} G\left(\frac{2\pi m}{N} - l\omega_0\right) \tag{5}$$

This equation can be simplified by recognizing that the sum over $$G\left(\frac{2\pi m}{N} - l\omega_0\right)$$

is equal to one over the interval.

$$0 \leq m \leq \left\lfloor \frac{L\omega_0 N}{2\pi} \right\rfloor.$$

This means that the total energy in the speech is preserved over this interval, since the energy in the spectral magnitudes is equal to the energy in the speech spectrum. Note that the denominator in Equation (5) simply compensates for the window function w(n) used in computing $S_w(m)$ according to Equation (1). Another important point is that the bandwidth of the representation is dependent on the product $L\omega_0$. In practice the desired bandwidth is usually some fraction of the Nyquist frequency which is represented by $\pi$. Consequently the total number of spectral magnitudes, L, is inversely related to the estimated fundamental frequency for the current frame and is typically computed as follows:

$$L = \left\lfloor \frac{\alpha\pi}{\omega_0} \right\rfloor \quad (6)$$

where $0 \leq \alpha < 1$. A 3.6 kbps system which uses an 8 kHz sampling rate has been designed with $\alpha=0.925$ giving a bandwidth of 3700 Hz.

Weighting functions other than that described above can also be used in Equation (3). In fact, total power is maintained if the sum over $G(\omega)$ in Equation (5) is approximately equal to a constant (typically one) over some effective bandwidth. The weighting function given in Equation (4) uses linear interpolation over the FFT sampling interval ($2\pi/N$) to smooth out any fluctuations introduced by the sampling grid. Alternatively, quadratic or other interpolation methods could be incorporated into $G(\omega)$ without departing from the scope of the invention.

Although the invention is described in terms of the MBE speech model's binary V/UV decisions, the invention is also applicable to systems using alternative representations for the voicing information. For example, one alternative popularized in sinsoidal coders is to represent the voicing information in terms of a cut-off frequency, where the spectrum is considered voiced below this cut-off frequency and unvoiced above it. Other extensions such as non-biniary voicing information would also benefit from the invention. The invention improves the smoothness of the magnitude representations since discontinuities at voicing transitions and fluctuations caused by the FFT sampling grid are prevented. A well known result from information theory is that increased smoothness facilitates accurate quantization of the spectral magnitudes with a small number of bits. In the 3.6 kbps system 72 bits are used to quantize the model parameters for each 20 ms frame. Seven (7) bits are used to quantize the fundamental frequency, and 8 bits are used to code the V/UV decisions in 8 different frequency bands (approximately 500 Hz each). The remaining 57 bits per frame are used to quantize the spectral magnitudes for each frame. A differential block Discrete Cosine Transform (DCT) method is applied to the log spectral magnitudes. The invention's increased smoothness compacts more of the signal power into the slowly changing DCT components. The bit allocation and quantizer step sizes are adiusted to account for this effect giving lower spectral distortion for the available number of bits per frame. In mobile communications applications it is often desirable to include additional redundancy to the bit stream prior to transmission across the mobile channel. This redundancy is typically generated by error correction and/or detection codes which add additional redundancy to the bit stream in such a manner that bit errors introduced during transmission can be corrected and/or detected. For example, in a 4.8 kbps mobile satellite application, 1.2 kbps of redundant data is added to the 3.6 kbps of speech data. A combination of one [24,12] Golay code and three [15,11] Hamming Codes is used to generate the additional 24 redundant bits added to each frame. Many other types of error correction codes, such as convolutional, BCH, Reed-Solomon, etc . . . , could also be employed to change the error robustness to meet virtually any channel condition.

At the receiver the decoder receives the transmitted bit stream and reconstructs the model parameters (fundamental frequency, V/UV decisions and spectral magnitudes) for each frame. In practice the received bit stream may contain bit errors due to noise in the channel. As a consequence the V/UV bits may be decoded in error, causing a voiced magnitude to be interpreted as unvoiced or vice versa. The invention reduces the perceived distortion from these voicing errors since the magnitude itself, is independent of the voicing state. Another advantage of the invention occurs during formant enhancement at the receiver. Experimentation has shown perceived quality is enhanced if the spectral magnitudes at the formant peaks are increased relative to the spectral magnitudes at the formant valleys. This process tends to reverse some of the formant broadening which is introduced during quantization. The speech then sounds crisper and less reverberant. In practice the spectral magnitudes are increased where they are greater than the local average and decreased where they are less than the local average. Unfortunately, discontinuities in the spectral magnitudes can appear as formants, leading to spurious increases or decreases. The invention's improved smoothness helps solve this problem leading to improved formant enhancement while reducing spurious changes.

As in previous MBE systems, the new MBE based encoder does not estimate or transmit any spectral phase information. Consequently, the new MBE based decoder must regenerate a synthetic phase for all voiced harmonics during voiced speech synthesis. The invention features a new magnitude dependent phase generation method which more closely approximates actual speech and improves overall voice quality. The prior art technique of using random phase in the voiced components is replaced with a measurement of the local smoothness of the spectral envelope. This is justified by linear system theory, where spectral phase is dependent on the pole and zero locations. This can be modeled by linking the phase to the level of smoothness in the spectral magnitudes. In practice an edge detection computation of the following form is applied to the decoded spectral magnitudes for the current frame:

$$\phi_l = \sum_{m=-D}^{D} h(m) B_{l+m} \text{ for } 1 \leq l \leq L \quad (7)$$

where the parameters $B_l$ represent the compressed spectral magnitudes and h(m) is an appropriately scaled edge detection kernel. The output of this equation is a set of regenerated phase values, $\phi_l$, which determine the phase relationship between the voiced harmonics. One should note that these values are defined for all harmonics, regardless of the voicing state. However, in MBE based systems only the voiced synthesis procedure uses these phase values, while the unvoiced synthesis procedure ignores them. In practice the regenerated phase values are computed for all harmonics and then stored, since they may be used during the synthesis of the next frame as explained in more detail below (see Equation (20)). The compressed magnitude parameters $B_l$ are generally computed by passing the spectral magnitudes $M_l$ through a companding function to reduce their dynamic range. In addition extrapolation is performed to generate additional spectral values beyond the edges of the magnitude representation (i.e. $l \leq 0$ and $l > L$). One particularly suitable compression function is the logarithm, since it converts any overall scaling of the spectral magnitudes $M_l$, (i.e. its loudness or volume) into an additive offset in $B_l$. Assuming that h(m) in Equation (7) is zero mean, then this offset is ignored and the regenerated phase values $\phi_l$ are independent of scaling. In practice $\log_2$ has been used since it is easily computable on a digital computer. This leads to the following expression for $B_l$:

$$B_l = \begin{cases} 0 & \text{for } l = 0 \\ \log_2(M_l) & \text{for } 1 \leq |l| \leq L \\ \log_2(M_L) - \gamma * (l - L) & \text{for } L < |l| \leq L + D \end{cases} \quad (8)$$

The extrapolated values of $B_l$ for $l > L$ are designed to emphasize smoothness at harmonic frequencies above the represented bandwidth. A value of $\gamma=0.72$ has been used in the 3.6 kbps system, but this value is not considered critical, since the high frequency components generally contribute less to the overall speech than the low frequency components. Listening tests have shown that the values of $B_l$ for $l \leqq 0$ can have a significant effect on perceived quality. The value at $l=0$ was set to a small value since in many applications such as telephony there is no DC response. In addition listening experiments showed that $B_0=0$ was preferable to either positive or negative extremes. The use of a symmetric response $B_{-l}=B_l$ was based on system theory as well as on listening experiments.

The selection of an appropriate edge detecion kernel $h/(m)$ is important for overall quality. Both the shape and scaling influence the phase variables $\phi_l$ which are used in voiced synthesis, however a wide range of possible kernels could be successfully employed. Several constraints have been found which generally lead to well designed kernels. Specifically, if $h(m) \geqq 0$ for $m > 0$ and if $h(m)=-h(-m)$ then the function is typically better suited to localize discontinuities. In addition it is useful to constrain $h(0)=0$ to obtain a zero mean kernel for scaling independence. Another desirable property is that the absolute value of $h(m)$ should decay as $|m|$ increases in order to focus on local changes in the spectral magnitudes. This can be achieved by making $h(m)$ inversely proportional to m. One equation (of many) which satisfies all of these constraints is shown in Equation (9).

$$h(m) = \begin{cases} \frac{\lambda}{m} & \text{for } m \text{ odd and } -D \leqq m \leqq D \\ 0 & \text{otherwise} \end{cases} \tag{9}$$

The preferred embodiment of the invention uses Equation (9) with $\lambda=0.44$. This value was found to produce good sounding speech with modest complexity, and the synthesized speech was found to possess a peak-to-rms energy ratio close to that of the original speech. Tests performed with alternate values of $\lambda$ showed that small variations from the preferred value resulted in nearly equivalent performance. The kernel length D can be adjusted to tradeoff complexity versus the amount of smoothing. Longer values of D are generally preferred by listeners, however a value of D=19 has been found to be essentially equivalent to longer lengths and hence D=19 is used in the new 3.6 kbps system.

One should note that the form of Equation (7) is such that all of the regenerated phase variables for each frame can be computed via a forward and inverse FFT operation. Depending on the processor, an FFT implementation can lead to greater computational efficiency for large D and L than direct computation.

The calculation of the regenerated phase variables is greatly facilitated by the invention's new spectral magnitude representation which is independent of voicing state. As discussed above the kernel applied via Equation (7) accentuates edges or other fluctuations in the spectral envelope. This is done to approximate the phase relationship of a linear system in which the spectral phase is linked to changes in the spectral magnitude via the pole and zero locations. In order to take advantage of this property, the phase regeneration procedure must assume that the spectral magnitudes accurately represent the spectral envelope of the speech. This is facilitated by the invention's new spectral magnitude representation, since it produces a smoother set of spectral magnitudes than the prior art. Removal of discontinuities and fluctuations caused by voicing transitions and the FFT sampling grid allows more accurate assessment of the true changes in the spectral envelope. Consequently phase regeneration is enhanced, and overall speech quality is improved.

Once the regenerated phase variables, $\phi_l$, have been computed according to the above procedure, the voiced synthesis process synthesizes the voiced speech $s_v(n)$ as the sum of individual sinusoidal components as shown in Equation (10). The voiced synthesis method is based on a simple ordered assignment of harmonics to pair the l'th spectral amplitude of the current frame with the l'th spectral amplitude of the previous frame. In this process the number of harmonics, fundamental frequency, V/UV decisions and spectral amplitudes of the current frame are denoted as L(0), $\omega_0(0)$, $v_k(0)$ and $M_l(0)$, respectively, while the same parameters for the previous frame are denoted as L(−S), $\omega_0(-S)$, $v_k(-S)$ and $M_l(-S)$. The value of S is equal to the frame length which is 20 ms (160 samples) in the new 3.6 kbps system.

$$s_v(n) = \sum_{l=1}^{\max[L(-S),L(0)]} 2 \cdot s_{v,l}(n) \text{ for } -S < n \leqq 0 \tag{10}$$

The voiced component $S_{v,l}(n)$ represents the contribution to the voiced speech from the l'th harmonic pair. In practice the voiced components are designed as slowly varying sinusoids, where the amplitude and phase of each component is adjusted to approximate the model parameters from the previous and current frames at the endpoints of the current synthesis interval (i.e. at n=−S and n=0), while smoothly interpolating between these parameters over the duration of the interval −S<n<0.

In order to accommodate the fact that the number of parameters may be different between successive frames, the synthesis method assumes that all harmonics beyond the allowed bandwidth are equal to zero as shown in the following equations.

$$M_l(0) = 0 \text{ for } l > L(0) \tag{11}$$

$$M_l(-S) = 0 \text{ for } l > L(-S) \tag{12}$$

In addition it assumes that these spectral amplitudes outside the normal bandwidth are labeled as unvoiced. These assumptions are needed for the case where the number of spectral amplitudes in the current frame is not equal to the number of spectral amplitudes in the previous frame (i.e. L(0)≠L(−S)).

The amplitude and phase functions are computed differently for each harmonic pair. In particular the voicing state and the relative change in the fundamental frequency determine which of four possible functions are used for each harmonic for the current synthesis interval. The first possible case arises if the l'th harmonic is labeled as unvoiced for both the previous and current speech frame, in which event the voiced component is set equal to zero over the interval as shown in the following equation.

$$s_{v,l}(n)=0 \text{ for } -S<n\leqq 0 \tag{13}$$

In this case the speech energy around the l'th harmonic is entirely unvoiced and the unvoiced synthesis procedure is responsible for synthesizing the entire contribution.

Alternatively, if the l'th harmonic is labeled as unvoiced for the current frame and voiced for the previous frame, then $s_{v,l}(n)$ is given by the following equation, $$s_{v,l}(n)=w_s(n+S)\, M_l(-S)\, cos[\omega_0(-S)\,(n+S)l+\theta_l(-S)] \text{ for } -S<n\leqq 0 \tag{14}$$

In this case the energy in this region of the spectrum transitions from the voiced synthesis method to the unvoiced synthesis method over the duration of the synthesis interval.

Similarly, if the l'th harmonic is labeled as voiced for the current frame and unvoiced for the previous frame then $s_{v,l}(n)$ is given by the following equation.

$$s_{v,l}(n)=w_s(n)\,M_l(0)\,cos[\omega_0(0)nl+\theta_l(0)] \text{ for } -S<n\leqq 0 \quad (15)$$

In this case the energy in this region of the spectrum transitions from the unvoiced synthesis method to the voiced synthesis method.

Otherwise, if the l'th harmonic is labeled as voiced for both the current and the previous frame, and if either l>=8 or $|\omega_0(0)-\omega_0(-S)|\geqq 0.1\,\omega_0(0)$, then *shd* $v,l(n)$ is given by the following equation, where the variable n is restricted to the range $-S<n\leqq 0$.

$$s_{v,l}(n) = w_s(n+S)M_l(-S)\cos[\omega_0(-S)(n+S)l+\theta_l(-S)] + w_s(n)M_l(0)\cos[\omega_0(0)nl+\theta_l(0)] \quad (16)$$

The fact that the harmonic is labeled voiced in both frames, corresponds to the situation where the local spectral energy remains voiced and is completely synthesized within the voiced component. Since this case corresponds to relatively large changes in harmonic frequency, an overlap-add approach is used to combine the contribution from the previous and current frame. The phase variables $\theta_l(-S)$ and $\theta_l(0)$ which are used in Equations (14), (15) and (16) are determined by evaluating the continuous phase function $\theta_l(n)$ described in Equation (20) at n=−S and n=0.

A final synthesis rule is used if the l'th spectral amplitude is voiced for both the current and the previous frame, and if both l<8 and $|\omega_0(0)-\omega_0(-S)|<0.1\,\omega_0(0)$. As in the prior case, this event only occurs when the local spectral energy is entirely voiced. However, in this case the frequency difference between the previous and current frames is small enough to allow a continuous transition in the sinusoidal phase over the synthesis interval. In this case the voiced component is computed according to the following equation, $$s_{v,l}(n)=a_l(n)\,cos[\theta_l(n)] \text{ for } -S<n\leqq 0 \quad (17)$$

where the amplitude function, $a_l(n)$, is computed according to Equation (18), and the phase function, $\theta_l(n)$, is a low order polynomial of the type described in Equations (19) and (20).

$$a_l(n) = w_s(n+S)M_l(-S) + w_s(n)M_l(0) \quad (18)$$

$$\theta_l(n) = \theta_l(-S) + [\omega_0(-S)\cdot l + \Delta\omega_l]\,(n+S) + [\omega_0(0)-\omega_0(-S)]\cdot\frac{l\,(n+S)^2}{2S} \quad (19)$$

$$\Delta\omega_l = \frac{1}{S}\left[\phi_l(0)-\phi_l(-S)-2\pi\left\lfloor\frac{\phi_l(0)-\phi_l(-S)+\pi}{2\pi}\right\rfloor\right] \quad (20)$$

The phase update process described above uses the invention's regenerated phase values for both the previous and current frame (i.e. $\phi_l(0)$ and $\phi_l(-S)$) to control the phase function for the l'th harmonic. This is performed via the second order phase polynomial expressed in Equation (19) which ensures continuity of phase at the ends of the synthesis boundary via a linear phase term and which otherwise meets the desired regenerated phase. In addition the rate of change of this phase polynomial is approximately equal to the appropriate harmonic frequency at the endpoints of the interval.

The synthesis window $w_s(n)$ used in Equations (14), (15), (16) and (18) is typically designed to interpolate between the model parameters in the current and previous frames. This is facilitated if the following overlap-add equation is satisfied over the entire current synthesis interval.

$$w_s(n)+w_s(n+S)=1 \text{ for } -S<n\leqq 0 \quad (21)$$

One synthesis window which has been found useful in the new 3.6 kbps system and which meets the above constraint is defined as follows:

$$w_s(n) = \begin{cases} 1 & \text{for } |n| \leqq (S-\beta)/2 \\ 1+\frac{(S-\beta)-2n}{2\beta} & \text{for } (S-\beta)/2 < n < (S+\beta)/2 \\ 1+\frac{(S-\beta)+2n}{2\beta} & \text{for } -(S-\beta)/2 > n > -(S+\beta)/2 \\ 0 & \text{otherwise} \end{cases} \quad (22)$$

For a 20 ms frame size (S=160) a value of β=50 is typically used. The synthesis window presented in Equation (22) is essentially equivalent to using linear interpolation.

The voiced speech component synthesized via Equation (10) and the described procedure must still be added to the unvoiced component to complete the synthesis process. The unvoiced speech component, $s_{uv}(n)$, is normally synthesized by filtering a white noise signal with a filter response of zero in voiced frequency bands and with a filter response determined by the spectral magnitudes in frequency bands declared unvoiced. In practice this is performed via a weighted overlap-add procedure which uses a forward and inverse FFT to perform the filtering. Since this procedure is well known, the references should be consulted for complete details.

Various alternatives and extensions to the specific techniques taught here could be used without departing from the spirit and scope of the invention. For example a third order phase polynomial could be used by replacing the $\Delta\omega_l$ term in Equation (19) with a cubic term having the correct boundary conditions. In addition the prior art describes alternative windows functions and interpolation methods as well as other variations. Other embodiments of the invention are within the following claims.

TABLE 1

Preferred Window Function

| n | w(n) = w(−n) |
|---|---|
| 0 | 0.672176 |
| 1 | 0.672100 |
| 2 | 0.671868 |
| 3 | 0.671483 |
| 4 | 0.670944 |
| 5 | 0.670252 |
| 6 | 0.669406 |
| 7 | 0.668408 |
| 8 | 0.667258 |
| 9 | 0.665956 |
| 10 | 0.664504 |
| 11 | 0.662901 |
| 12 | 0.661149 |
| 13 | 0.659249 |
| 14 | 0.657201 |
| 15 | 0.655008 |
| 16 | 0.652668 |
| 17 | 0.650186 |
| 18 | 0.647560 |
| 19 | 0.644794 |
| 20 | 0.641887 |
| 21 | 0.638843 |
| 22 | 0.635662 |
| 23 | 0.632346 |
| 24 | 0.628896 |
| 25 | 0.625315 |
| 26 | 0.621605 |
| 27 | 0.617767 |
| 28 | 0.613803 |
| 29 | 0.609716 |
| 30 | 0.605506 |
| 31 | 0.601178 |
| 32 | 0.596732 |
| 33 | 0.592172 |
| 34 | 0.587499 |

TABLE 1-continued

Preferred Window Function

| n | w(n) = w(−n) |
|---|---|
| 35 | 0.582715 |
| 36 | 0.577824 |
| 37 | 0.572828 |
| 38 | 0.567729 |
| 39 | 0.562530 |
| 40 | 0.557233 |
| 41 | 0.551842 |
| 42 | 0.546358 |
| 43 | 0.540785 |
| 44 | 0.535125 |
| 45 | 0.529382 |
| 46 | 0.523558 |
| 47 | 0.517655 |
| 48 | 0.511677 |
| 49 | 0.505628 |
| 50 | 0.499508 |
| 51 | 0.493323 |
| 52 | 0.487074 |
| 53 | 0.480765 |
| 54 | 0.474399 |
| 55 | 0.467979 |
| 56 | 0.461507 |
| 57 | 0.454988 |
| 58 | 0.448424 |
| 59 | 0.441818 |
| 60 | 0.435173 |
| 61 | 0.428493 |
| 62 | 0.421780 |
| 63 | 0.415038 |
| 64 | 0.408270 |
| 65 | 0.401478 |
| 66 | 0.394667 |
| 67 | 0.387839 |
| 68 | 0.380996 |
| 69 | 0.374143 |
| 70 | 0.367282 |
| 71 | 0.360417 |
| 72 | 0.353549 |
| 73 | 0.346683 |
| 74 | 0.339821 |
| 75 | 0.332967 |
| 76 | 0.326123 |
| 77 | 0.319291 |
| 78 | 0.312476 |
| 79 | 0.305679 |
| 80 | 0.298904 |
| 81 | 0.292152 |
| 82 | 0.285429 |
| 83 | 0.278735 |
| 84 | 0.272073 |
| 85 | 0.265446 |
| 86 | 0.258857 |
| 87 | 0.252308 |
| 88 | 0.245802 |
| 89 | 0.239340 |
| 90 | 0.232927 |
| 91 | 0.226562 |
| 92 | 0.220251 |
| 93 | 0.213993 |
| 94 | 0.207792 |
| 95 | 0.201650 |
| 96 | 0.195568 |
| 97 | 0.189549 |
| 98 | 0.183595 |
| 99 | 0.177708 |
| 100 | 0.171889 |
| 101 | 0.166141 |
| 102 | 0.160465 |
| 103 | 0.154862 |
| 104 | 0.149335 |
| 105 | 0.143885 |
| 106 | 0.138513 |
| 107 | 0.133221 |
| 108 | 0.128010 |
| 109 | 0.122882 |
| 110 | 0.117838 |
| 111 | 0.112879 |
| 112 | 0.108005 |
| 113 | 0.103219 |
| 114 | 0.098521 |
| 115 | 0.093912 |
| 116 | 0.089393 |
| 117 | 0.084964 |
| 118 | 0.080627 |
| 119 | 0.076382 |
| 120 | 0.072229 |
| 121 | 0.068170 |
| 122 | 0.064204 |
| 123 | 0.051844 |
| 124 | 0.040169 |
| 125 | 0.029162 |
| 126 | 0.018809 |
| 127 | 0.009094 |

We claim:

1. A method for encoding a speech signal into a plurality of digital bits from which the speech signal can later be synthesized, the method comprising the steps of:

processing the speech signal to divide the signal into a plurality of speech frames, each of the speech frames representing a time interval of the speech signal;

processing the speech frames to determine voicing information for a plurality of frequency bands of the speech frames;

processing the speech frames to determine spectral magnitudes representative of the magnitudes of the spectrum at determined frequencies across the frequency bands, and quantizing and encoding the spectral magnitudes and the voicing information for subsequent use in decoding and synthesizing the speech signal, wherein the processing of the speech frames to determine spectral magnitudes and the quantizing and encoding of the spectral magnitudes is done in such a manner that spectral magnitudes independent of the voicing information are available for later synthesizing.

2. Apparatus for encoding a speech signal into a plurality of digital bits from which the speech signal can later be synthesized, the apparatus comprising:

means for processing the speech signal to divide the signal into a plurality of speech frames, each of the speech frames representing a time interval of the speech signal;

means for processing the speech frames to determine voicing information for a plurality of frequency bands of the speech frames;

means for processing the speech frames to determine spectral magnitudes representative of the magnitudes of the spectrum at determined frequencies across the frequency bands, and means for quantizing and encoding the spectral magnitudes and the voicing information for subsequent use in decoding and synthesizing the speech signal, wherein the processing of the speech frames to determine spectral magnitudes and the quantizing and encoding of the spectral magnitudes is done in such a manner that spectral magnitudes independent of the voicing information are available for later synthesizing.

3. The subject matter of claim 1 or 2, wherein the speech signal is processed to estimate a parameter representative of the fundamental frequency, and the determined frequencies are harmonic multiples of the fundamental frequency.

4. The subject matter of claim 3, wherein the parameter representative of the fundamental frequency is quantized and encoded for each of the speech frames, so that the digital bits include information representing the spectral magnitudes, voicing information, and fundamental frequency.

5. The subject matter of claim 4, wherein the digital bits include redundant bits providing forward error correction coding.

6. The subject matter of claim 5 wherein the forward error correction coding includes Golay codes and Hamming codes.

7. The subject matter of claim 3, wherein the processing of the speech frames to determine the spectral magnitudes is done independently of the voicing information for the frame.

8. The subject matter of claim 7, wherein the voicing information represents whether particular frequency bands within a speech frame are processed as voiced or unvoiced bands, and the processing to determine spectral magnitudes determines the spectral magnitude for a particular determined frequency independently of whether the determined frequency is in a frequency band that is voiced or unvoiced.

9. The subject matter of claim 3, wherein the processing to determine spectral magnitudes includes a spectral transformation of the speech frames from time domain samples to frequency samples, and wherein the spectral magnitudes are formed as weighted sums of the frequency samples.

10. The subject matter of claim 9, wherein weights used in producing the weighted sums have the effect of compensating for the sampling grid used in the spectral transformation.

11. The subject matter of claim 1 or 2, wherein the processing of the speech frames to determine the spectral magnitudes is done independently of the voicing information for the frame.

12. The subject matter of claim 11, wherein the voicing information represents whether particular frequency bands within a speech frame are processed as voiced or unvoiced bands, and the processing to determine spectral magnitudes determines the spectral magnitude for a particular determined frequency independently of whether the determined frequency is in a frequency band that is voiced or unvoiced.

13. The subject matter of claim 1 or 2, wherein the processing to determine spectral magnitudes includes a spectral transformation of the speech frames from time domain samples to frequency samples, and wherein the spectral magnitudes are formed as weighted sums of the frequency samples.

14. The subject matter of claim 13 wherein weights used in producing the weighted sums have the effect of compensating for the sampling grid used in the spectral transformation.

15. A method for encoding a speech signal into a plurality of digital bits from which the speech signal can later be synthesized, the method comprising the steps of:

processing the speech signal to divide the signal into a plurality of speech frames, each of the speech frames representing a time interval of the speech signal;

processing the speech frames to determine voicing information for a plurality of frequency bands of the speech frames;

processing the speech frames to determine spectral magnitudes representative of the magnitudes of the spectrum at determined frequencies across the frequency bands, and quantizing and encoding the spectral magnitudes and the voicing information for subsequent use in decoding and synthesizing the speech signal, wherein the processing to determine spectral magnitudes includes a spectral transformation of the speech frames from time domain samples to frequency samples, and wherein the spectral magnitudes are formed as weighted sums of the frequency samples.

16. Apparatus for encoding a speech signal into a plurality of digital bits from which the speech signal can later be synthesized, the apparatus comprising:

means for processing the speech signal to divide the signal into a plurality of speech frames, each of the speech frames representing a time interval of the speech signal, means for processing the speech frames to determine voicing information for a plurality of frequency bands of the speech frames;

means for processing the speech frames to determine spectral magnitudes representative of the magnitudes of the spectrum at determined frequencies across the frequency bands, and means for quantizing and encoding the spectral magnitudes and the voicing information for subsequent use in decoding and synthesizing the speech signal, wherein the processing to determine spectral magnitudes includes a spectral transformation of the speech frames from time domain samples to frequency samples, and wherein the spectral magnitudes are formed as weighted sums of the frequency samples.

17. The subject matter of claim 15 or 16, wherein weights used in producing the weighted sums have the effect of compensating for the sampling grid used in the spectral transformation.

18. The subject matter of claim 15 or 16, wherein the speech signal is processed to estimate a parameter representative of the fundamental frequency, and the determined frequencies are harmonic multiples of the fundamental frequency.

19. The subject matter of claim 18, wherein the parameter representative of the fundamental frequency is quantized and encoded for each of the speech frames, so that the digital bits include information representing the spectral magnitudes, voicing information, and fundamental frequency.

* * * * *

UNITED STATES PATENT AND TRADEMARK OFFICE
CERTIFICATE OF CORRECTION

PATENT NO. : 5,754,974
DATED : May 19, 1998
INVENTOR(S) : Daniel W. Griffin and John C. Hardwick It is certified that error appears in the above-identified patent and that said Letters Patent is hereby corrected as shown below:

Title page,
Item [57], ABSTRACT,
Line 10, "done is" should be -- done in --.

Item [56], References Cited, OTHER PUBLICATIONS,
The "Heron" reference "Incorporation" should be -- Incorporating --.

Column 1,
Line 9, after "of", insert -- MBE-based Coded --.
Line 20, after "4,885,790", insert -- ( --.

Column 2,
Line 3, "steam" should be -- stream --.

Column 7,
Equation (3), "m=0" should be -- n=0 --.

Column 13,
Equation (15), insert -- s -- at the beginning of the equation.
Line 7, "s*hd*" should be -- s --.

Column 14,
Before "TABLE 1", insert -- Appendix --.

Signed and Sealed this

Thirtieth Day of April, 2002

Attest:

JAMES E. ROGAN
*Director of the United States Patent and Trademark Office*

*Attesting Officer*